United States Patent
Proulx et al.

[11] Patent Number: 5,980,759
[45] Date of Patent: *Nov. 9, 1999

[54] DUAL MEDIA FILTER CARTRIDGE CONSTRUCTION

[75] Inventors: Stephen Proulx, Littleton; Frank M. Lentine, Bedford; John L. Burns, Jr., Dracut, all of Mass.

[73] Assignee: Millipore Corporation, Bedford, Mass.

[*] Notice: This patent is subject to a terminal disclaimer.

[21] Appl. No.: 08/476,149

[22] Filed: Jun. 7, 1995

Related U.S. Application Data

[63] Continuation-in-part of application No. 08/138,795, Oct. 19, 1993, abandoned, which is a continuation-in-part of application No. 08/249,825, May 26, 1994, abandoned.

[51] Int. Cl.⁶ .................................................. B01D 27/06
[52] U.S. Cl. .................... 210/767; 210/321.86; 210/489; 210/493.1; 210/493.4; 210/493.5; 210/492; 210/496; 210/497.01; 210/500.21; 210/500.27; 210/448
[58] Field of Search ..................... 210/256, 314, 210/315, 321.86, 338, 446, 448, 488, 489, 492, 493.1, 493.2, 493.4, 493.5, 767, 457, 496, 497.01, 499, 500.21, 500.27

[56] References Cited

U.S. PATENT DOCUMENTS

| | | | |
|---|---|---|---|
| 2,689,652 | 9/1954 | Gretzinger | 210/493.4 |
| 2,801,009 | 7/1957 | Bowers | 210/493.4 |
| 3,115,459 | 12/1963 | Giesse | 210/484 |
| 3,290,870 | 12/1966 | Jensen | 210/489 |
| 3,334,752 | 8/1967 | Matravers | 210/493.5 |
| 3,361,260 | 1/1968 | Buckman | 210/315 |
| 3,368,687 | 2/1968 | Ruschman | 210/493.1 |
| 3,370,708 | 2/1968 | Hultgren et al. | 210/315 |
| 3,390,780 | 7/1968 | Bennett | 210/338 |
| 3,397,793 | 8/1968 | MacDonnell | 210/484 |
| 3,552,553 | 1/1971 | Reading | 210/493.1 |
| 3,656,627 | 4/1972 | Briggs | 210/338 |
| 3,827,566 | 8/1974 | Ponce | 210/338 |
| 3,867,294 | 2/1975 | Pall et al. | 210/489 |
| 4,419,241 | 12/1983 | Hoffmann | 210/493.5 |
| 5,024,761 | 6/1991 | Deibel | 210/446 |
| 5,082,476 | 1/1992 | Kahlbaugh . | |
| 5,156,740 | 10/1992 | Bruschlze | 210/490 |
| 5,198,107 | 3/1993 | Ponce | 210/338 |
| 5,238,474 | 8/1993 | Kahlbaugh . | |
| 5,364,456 | 11/1994 | Kahlbaugh . | |
| 5,423,892 | 6/1995 | Kahlbaugh . | |

FOREIGN PATENT DOCUMENTS

WO92/06767  4/1992  WIPO .

*Primary Examiner*—Robert J. Popovics
*Attorney, Agent, or Firm*—J. Dana Hubbard; Timothy J. King

[57] ABSTRACT

A filter cartridge is provided which includes (a) a wound depth filter or a cylindrical seamless depth filter and (b) a pleated filter having a lower micron retention rating than the depth filter. The depth filter and pleated filter surround a central opening. The cartridge is sealed and an appropriate inlet or outlet is provided in order to assure sequential fluid flow first through the depth filter and then through the pleated filter.

38 Claims, 10 Drawing Sheets

DUAL MEDIA FILTER CARTRIDGE CONSTRUCTION

REFERENCE TO RELATED APPLICATIONS

This application is a continuation-in-part of application Ser. No. 08/138,795, filed Oct. 19, 1993 now abandoned and a continuation-in-part of application Ser. No. 08/249,825, filed May 26, 1994 now abandoned.

BACKGROUND OF THE INVENTION

This invention relates to a filter cartridge construction suitable for filtering liquids and gases.

At the present time a wide variety of filter cartridge constructions are utilized to purify fluids. These cartridge constructions are designed to remove solids and colloidal particles as well as microorganisms. The basic two separate and distinct types of cartridges used in filtration of gases and liquids are depth filters (typically wound) and surface or screen filters (usually pleated). A depth filter is primarily used to remove most of the contaminants and particles. It is typically utilized upstream of a surface or screen filter. The most important properties for a depth filter are its "dirt holding capacity" or throughput, pressure drop and retention. The filter design allows contaminants and particles to be trapped in stages within the depth of the filter due to the construction of the multiple layers of various media types. A wound depth filter has multiple layers with the most open media (largest micron retention rating) i.e. largest pore size usually the outermost layer, adjacent the liquid inlet with the tightest media (smallest micron retention rating, i.e. smallest pore size) adjacent the liquid outlet. The tightest media at the core adjacent the liquid outlet will have the least amount of surface area due to the smallest diameter around which it is wrapped. This layer at the core contributes to most of the pressure drop of the cartridge because the media has the highest pressure drop and the least amount of filtration surface area. Likewise, this layer will significantly reduce the capacity of the filter due to both the low filtration surface area and the smallest micron retention rating.

A surface or screen filter will retain virtually 100% of the particles or contaminants for which it is rated. The media used in a surface or screen filter typically has a high pressure drop and low "dirt holding capacity" or throughput because of its high retention efficiency. The media normally used in a surface filter comprises glass or polymeric microfibers. The normally used medium in a screen filter comprises a polymeric microporous membrane. Particles are retained by size exclusion primarily on the surface of the screen filter rather than within the depth of the filter. Particles are retained primarily on the surface of a surface filter which has a controlled pore size. Particles smaller than the controlled pore size tend to be trapped within the media of the surface filter. However as a result of the controlled pore structure, they provide more predictable filtration than depth filters. For the surface or screen filter to be economical, the media is pleated to obtain a large filtration surface area. Presently, the wound depth filter and the surface or screen filter are utilized in series in separate housings to effect the desired level of purification.

The useful life of a filter construction is the time the filter construction functions to remove particles of a size for which it is rated while avoiding a desired maximum pressure drop between the inlet and outlet of the filter construction. When the filter construction either fails to retain particles of a size for which it is rated or a pressure drop larger than desired results due to particle retention within the filter construction, it is replaced.

It is economically desirable to maximize the useful life of a filter construction. Convenient measures of useful life of a filter construction are the volume of fluid satisfactorily filtered prior to experiencing a pressure drop between its inlet and outlet which equals or exceeds the maximum pressure drop desired.

It is also desirable to minimize the volume of filter used to attain satisfactory filtration for a given time in order to minimize the cost of filter material. In addition, it is desirable to utilize a single filter housing rather than a plurality of filter housings in order to minimize filter housing cost and to eliminate the need for conduits and associated structures such as valves for connecting the housings. While a single housing is desirable, the filter construction positioned therein must be capable of retaining particles equal to and larger than a desired size while affording an economically satisfactory useful life.

It has been proposed in U.S. Pat. No. 3,552,553 to provide a dual media filtration cartridge formed from a pleated filtration medium positioned adjacent a liquid outlet from the cartridge and a porous foam medium adjacent a liquid inlet to the cartridge. The foam medium surrounds the pleated medium. This filter cartridge is undesirable since the foam medium has a random porosity which results in a random micron retention characteristic throughout the foam layer. This micron retention characteristic is undesirable since retained particles tend to be located within a narrow stratum within the foam which results in a portion of the foam thickness not being utilized for filtration.

It has also been proposed in U.S. Pat. No. 3,334,752 to provide a dual filter construction in a single housing. The filter construction comprises a pleated paper tube filter positioned on a hollow core and an upstream filter comprising napped wound yarn which surrounds the pleated filter. The wound yarn portion functions to remove slimy constituents while the pleated paper filter functions to remove even minute solid particles. The yarn, which has the same porosity through the depth of the upstream filter, is wound to form rhombic openings which diminish in cross-sectional area when proceeding from an outermost surface to the surface of the upstream filter positioned adjacent the pleated filter. Thus, the yarn utilized does not have progressive lower micron retention characteristics as one progresses toward the pleated filter.

It would be desirable to provide a filter cartridge construction which avoids the undesirably high pressure drop such as that due to the tightest filtration medium positioned adjacent the liquid outlet from the filter cartridge. Furthermore, it would be desirable to provide a filter cartridge having a significantly improved useful life as compared with filter cartridge of the prior art having at least about the same retention efficiency. Such filter cartridges would provide substantially improved economic benefit from the standpoint of increased satisfactory throughput fluid volume capacity while minimizing the cost of filter cartridge support apparatus to achieve this capacity.

SUMMARY OF THE INVENTION

This invention comprises a filter cartridge construction and filter assembly having a filtration medium formed of (a) a depth filter comprising either a cylindrical, seamless fibrous depth filter comprising a nonwoven fibrous mass or a wound depth filter and (b) a pleated screen or surface filter which are retained within a common housing. One end of the cartridge of this invention is sealed with a cap while the opposing end is sealed with a cap having a fluid inlet or outlet. The filtration medium is positioned around a hollow core which is in fluid communication with the filtration medium and the fluid inlet or outlet within the cap at one end of the filtration medium. The hollow core extends substantially the length of the cartridge. The depth filter comprises a layered filter having a plurality of filtration media, each having a different percent retention efficiency retention rating. The layers of the depth filter are either formed either of (a) wound or layered flat filtration sheets or (b) of a fibrous mass of nonwoven polymeric fibers secured together by mechanical entanglement or intertwining or a wound depth filter. The surface or screen filter comprises one or a plurality of pleated layers each being formed of a medium having a lower retention rating than that of the layers of the depth filter medium. The pleated filters are formed from surface or screen filters wherein the media have a controlled pore size of pores at the surface of the media. The filter cartridges of this invention provide substantially improved characteristics of reduced pressure drop, substantially equal retention efficiency and increased capacity (life) as compared to prior art filter cartridges formed from depth filters and surface or screen filters which are lain flat rather than being pleated and which are positioned within a common housing.

DESCRIPTION OF SPECIFIC EMBODIMENTS

Figure 1:
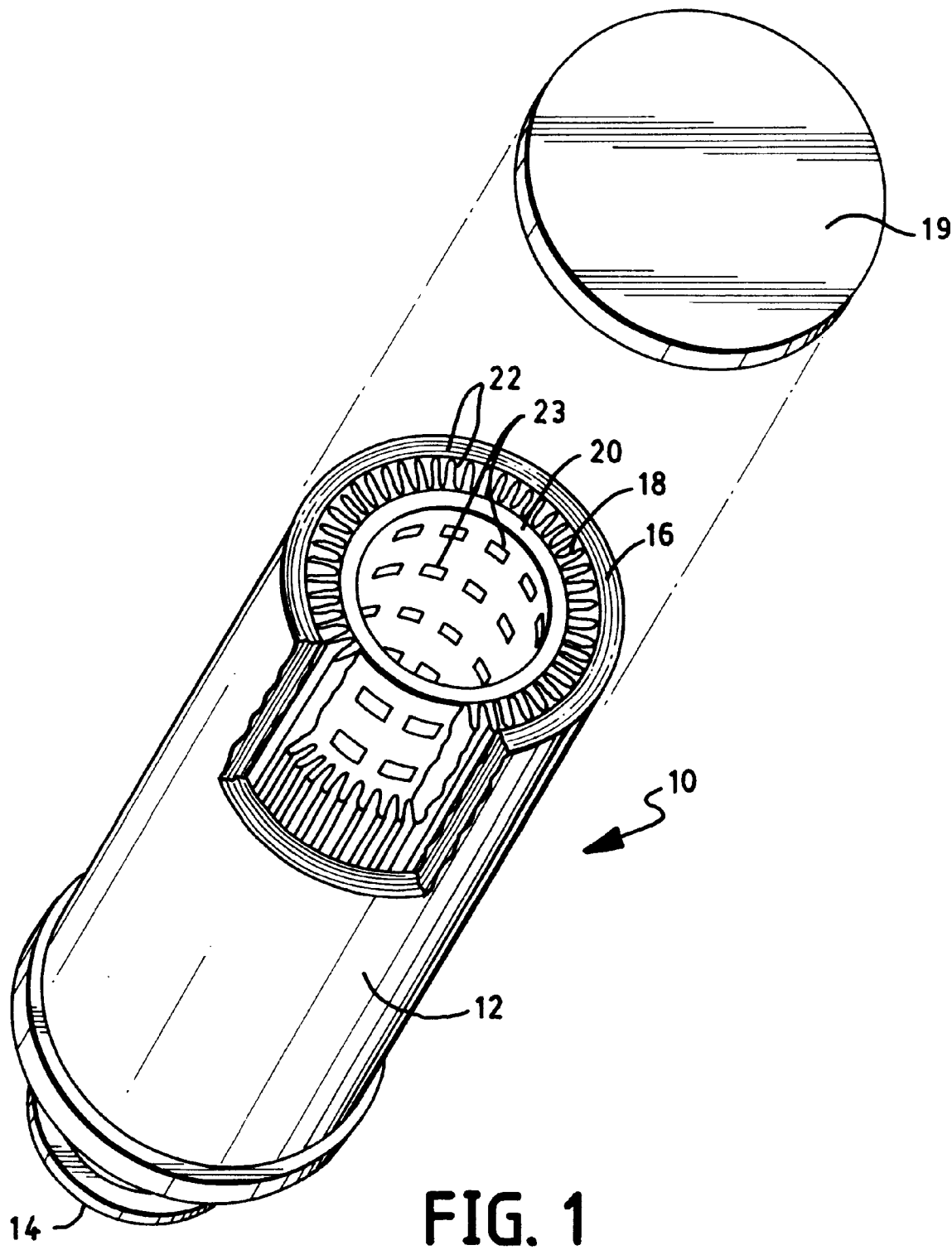
FIG. 1 is a perspective view in partial cross-section of the filter cartridge of this invention.

The present invention provides a filter cartridge construction which comprises (i) a depth filter comprising either (a) a wound depth filter or (b) a cylindrical seamless fibrous depth filter formed from a fibrous mass of fibers and (ii) a pleated surface or screen filter positioned on a hollow core.

The depth filter comprises a plurality of media (layers) each having a different micron retention size so that the permeability or retention of the media layers is largest adjacent a fluid inlet to the cartridge and is smallest adjacent the pleated surface or screen filter. Thus, large particles will be retained adjacent a feed inlet and progressively smaller particles will be retained as the feed passes through the filter cartridge. The inclusion of a pleated surface or screen filter in the construction rather than a filter which is lain to follow the surface contour of the core results in substantially lower pressure drop initially and over time within the cartridge. In addition, the retention capacity of the filter cartridge of this invention is substantially increased over a construction which utilizes a wound or layered arrangement of flat filtration sheets or of a cylindrical seamless fibrous depth filter having essentially the same retention efficiency. Furthermore, these improved performance characteristics are attained without adversely affecting the retention performance of the filtration medium. It has been found, in accordance with the invention, that the useful life of the filter cartridge of this invention is at least about 50% longer, preferably about 100% longer than a prior art filter wherein the portion of the depth filter having essentially the same retention efficiency as the pleated filter portion of this invention is positioned to follow the surface contour of the hollow core. Thus, the filter cartridge of this invention permits the use of fewer cartridges for a particular application and at a lower cost as compared to the filter cartridges of the prior art. Percent retention efficiency and Beta Ratio are measures of the ability of a cartridge to capture and retain particles. The Beta Ratio concept was introduced by the Fluid Power Research Center (FPRC) at Oklahoma State University (OSU) in 1970. Originally developed for use on hydraulic and lubricating oil filters, the test has been adapted by many cartridge manufactures to measure and predict cartridge filter performance in aqueous-base feeds. The Beta Ratio is defined by the FPRC as the number of particles greater than a given size (x) in the feed, divided by the number of particles greater than the same size in the effluent. Both percent retention efficiency and Beta Ratio values are calculated for specific particle size ranges.

The following equations show the relationship between Beta Ratio and percent retention efficiency:

$$\% \text{ Retention Efficiency} = \frac{(\text{Number of feed particles} - \text{Number of effluent particles}) \text{size } X}{\text{Number of feed particles (size } X)} \times 100$$

$$\text{Beta Ratio } (\beta) = \frac{\text{Number of fed particles (size } X)}{\text{Number of effluent particles (size } X)}$$

$$\% \text{ Retention Efficiency} = \frac{\beta - 1}{\beta} \times 100$$

$$\text{Beta Ratio } (\beta) = \frac{100}{100 - \% \text{ retention efficiency}}$$

The filtration medium utilized in the present invention comprises a depth filter in an initial stage and a second stage surface or screen media having a pleated construction. The depth filter can be a wound filter or a cylindrical seamless fibrous depth filter. The filter medium of the depth filter having the largest micron retention is positioned adjacent an inlet to the filter cartridge. The filter medium of the depth filter having the smallest micron retention is positioned adjacent the pleated filter. The micron retention characteristic of a filter can be raised by varying the diameter of fibers used to form the filter and/or the extent of comparison of the fibers such as by winding a filter media sheet tighter or looser around a core. A tighter wound filter media sheet gives a higher percent retention efficiency. Any intermediate filter media are positioned according to percent retention efficiency so that incoming fluid is passed sequentially through filter media having progressively smaller micron retention and lastly through the filter having the smallest micron retention. Thus, the overall filter cartridge presents a percent retention efficiency which comprises a progressive gradient from the inlet to the outlet wherein the percent retention efficiency progressively increases. Representative media useful for forming the depth filter include fibers of polyolefins such as polyethylene or polypropylene, cellulose, cotton, polyamides, polyesters, fiberglass or the like.

The depth filter element utilized in the apparatus of this invention can be charged or uncharged. A charged depth filter is formed of a composition which serve to attract particles in the feed to be retained by the filter. When utilizing a charged depth filter, the retention efficiency of the overall depth filter is increased. Any conventional means of charging the fibers or the like which form the depth filter can be utilized including chemical modification of the surface of the filter medium as is disclosed for example by U.S. Pat. No. 5,137,633 which is incorporated herein by reference or by corona discharge in the presence of oxygen or ozone.

The cylindrical fibrous depth filter is free of seams and is formed of fibers which produce a fibrous mass of fibers. This embodiment of the depth filter is characterized by a gradation of micron retention characteristics throughout its thickness in the radial direction. This gradation can be achieved either by varying the void volume of the cylindrical fibrous depth filter medium as a function of thickness in the radial direction or by maintaining a constant void volume and varying the size of the fibers as a function of depth filter thickness in the radial direction. In either embodiment all that is necessary is that the gradation of micron retention characteristics is produced. The gradation is effected such that the liquid to be filtered first encounters a layer of the depth filter having the largest micron retention characteristic (i. e. largest pores) and encounters layers having progressively smaller micron retention characteristics (i.e. smallest pores) prior to being directed into the pleated filter. The seamless cylindrical fibrous depth filter can be formed by any conventional means such as is disclosed in U.S. Pat. No. 3,933,557; 4,032,688; 4,726,901 or 4,594,202 which are incorporated herein by reference.

In one method for forming the cylindrical, seamless fibrous depth filter, for example, a molten thermoplastic composition is spun from a multiplicity of orifices arranged at an angle to a rotating mandrel. The orifices are positioned at a plurality or distances from the mandrel. Gas is directed at the orifices in a direction generally in the direction of projection of the fibers from the orifices to attenuate and disrupt the fibers into discrete lengths. The fibers are collected and wound on the mandrel to form a generally spirally wound cylindrical layer of randomly intertwined spun fibers and to form the seamless cylinder which can be removed from the mandrel. If desired, the mandrel can be formed of the pleated filter layer surrounded by a porous screen so that the filter cartridge of this invention can be formed simultaneously with forming the cylindrical, seamless fibrous depth filter. Micron retention characteristics for a given layer of the cylindrical fibrous depth filter can be controlled by controlling the rate of exit of fibers from a particular set of orifices which produce a given layer, thereby to control the void volume in that layers In a second method, the cylindrical seamless fibrous depth filter is formed in a manner whereby the voids volume throughout the filter thickness in the radial direction is essentially constant. The desired micron retention characteristic gradation is achieved by varying the size of the fibers throughout the cylindrical fibrous depth filter thickness in the radial direction. The smallest fibers produce a layer having the smallest micron retention characteristic while the largest fibers produce a layer having the largest micron retention characteristic. The fibers are formed by extruding a molten thermoplastic composition from a fiberizing die. The fibers are attenuated by a gas stream directed to a rotating, reciprocating mandrel. The fibers are cooled prior to their collection on the mandrel to a temperature below which the fibers bind to each other to substantially eliminate fiber-to-fiber bonding. The cooled fibers are collected on the mandrel and are subjected to a compression force to effect a substantially constant void volume through the thickness of the cylindrical, seamless fibrous depth filter in the radial direction. The cylindrical fibrous depth filter can be formed on the pleated filter surrounded by a screen which, in turn is mounted on the mandrel. Alternatively, the cylindrical, seamless fibrous depth filter can be formed directly on the rotating mandrel and subsequently removed therefrom.

Typically the voids volume of the cylindrical fibrous depth filter move between about 60 and 95% and varies no more than about 1 to 2%. Typically, the fibers range in diameter between about 1.6 and 16 micrometers.

The wound depth filter is formed by winding one or a plurality of filter sheets formed of fibers to form a generally cylindrical structure. The filter sheet or sheets have varying pore size such that the micron retention characteristic of a portion of the depth filter is a function of radial position within or on the depth filter. The portion of the wound depth filter positioned adjacent an inlet to a filter cartridge including the wound depth filter has the largest micron retention characteristic while the portion of the wound depth filter having the smallest micron retention characteristic, i.e., smallest pore size, is positioned adjacent the pleated filter. Any intermediate portions of the wound depth filter are positioned according to pore size so that incoming fluid is passed sequentially through portions of the depth filter having progressively smaller micron retention characteristics and lastly through the portion of the filter having the smallest micron retention characteristic. Representative media useful for forming wound depth filters include the fibers set forth above for the cylindrical seamless fibrous filters.

The surface or screen filter comprises one or a plurality of pleated constructions having a membrane filter sheet and one or more spacer layers to support the membrane filter sheet. The pleats can be in a corrugated shape or spirally positioned and can have a loop cross-section or a folded cross-section such as an M-shaped cross-section. As used herein, the terms "pleat", or "pleated" is intended to include all such cross-sectional shapes or positions. The pleated structure provides increased surface area which is initially exposed to fluid exiting from the depth filter as compared to a flat or curved non-pleated sheet construction. This pleated structure, in combination with the wound depth filter or the cylindrical seamless depth filter within a single housing, significantly reduces the rate of pressure drop during filtration without adversely affecting retention efficiency of the filter. When a plurality of pleated final filters are utilized, they are arranged concentrically adjacent relative to each other such as by being interleaved between each other or maintained as separate layers.

The depth filter comprising the wound depth filter or the cylindrical seamless pleated filter and the pleated filter are contained within a housing provided with a fluid inlet and a fluid outlet. The housing and seals assure that fluid to be filtered passes sequentially through the depth filter and then through the pleated final filter while preventing fluid by-pass. The inlet can be positioned at the outer surface of the housing or within a centrally located portion of the housing while the outlet is positioned remote from the inlet to effect fluid passage as described above.

The filter cartridge of this invention has a substantially larger useful life as compared to a filter cartridge which is a 100% depth filter wherein a portion of the depth filter has essentially the same retention efficiency as the pleated filter portion utilized in the present invention. Retention efficiency comprises the percentage retention by the filter cartridge of particles of a given size range admixed in the fluid being filtered. Applicants have found that by converting a portion of a depth filter having a small pore size relative to the remaining portion of the depth filter to a pleated filter construction, the useful life of the resulting filter cartridge is at least 50% longer and, more generally at least about 100% longer, than the useful life of the 100% depth filter. Generally, the portion of the 100% depth filter which has substantially the same retention efficiency as the pleated filter utilized in the present invention is about 20 to about 50% of the entire depth filter.

A convenient repeatable method for measuring the useful life of a filter cartridge including a depth filter cartridge and a filter cartridge of this invention is to challenge the filter cartridge with relatively pure water. The pure water can be product water from a reverse osmosis process which is substantially free of particulate and colloidal impurities to which is added a known concentration of hard particles having a known size range. A standard test dust of particles having a known size range is available from the AC Spark Plug Division of General Motors Corporation and is identified as AC Fine Test Dust, Lot 1307. The test dust is admixed with the relatively pure water so that the final mixture contains 80 ppm test dust. The mixture then is used to challenge a filter cartridge in accordance with Example 2. The useful life is conveniently determined by measuring the volume of the water-est dust mixture passed through the filter cartridge until an undesirable pressure drop is experienced between the inlet and outlet of the filter cartridge, e.g. 40 psi. The retention efficiency of the filter cartridge is determined by monitoring the concentration of test dust of varying size range in the feed to the filter cartridge and in the filtrate obtained from the filter cartridge. A convenient means for measuring test dust concentration as a function of particle size range is with a standard light scattering particle counter such as a Model 4100 monitor with Model 376 BCL particle sensor available from HIAC Royco Corporation.

A convenient comparison test for determining an alternate useful life of a filter cartridge when exposed to water containing both colloidal particles and hard particles is to challenge a filter cartridge to normal tap water which usually contains these contaminants. Since the composition of tap water varies from day to day, it is difficult to reproduce useful life measurements for a filter cartridge over time. However, for a given time and tap water composition, an accurate comparison can be made of the useful life of a plurality of cartridges when challenged with the same tap water. Applicants have found that when a filter cartridge of the present invention is challenged with tap water, its useful life is typically about 50% longer or more as compared to a 100% depth filter cartridge having a layer which has essentially the same retention efficiency as the pleated filter used in the filter cartridge of this invention.

Figure 1A:
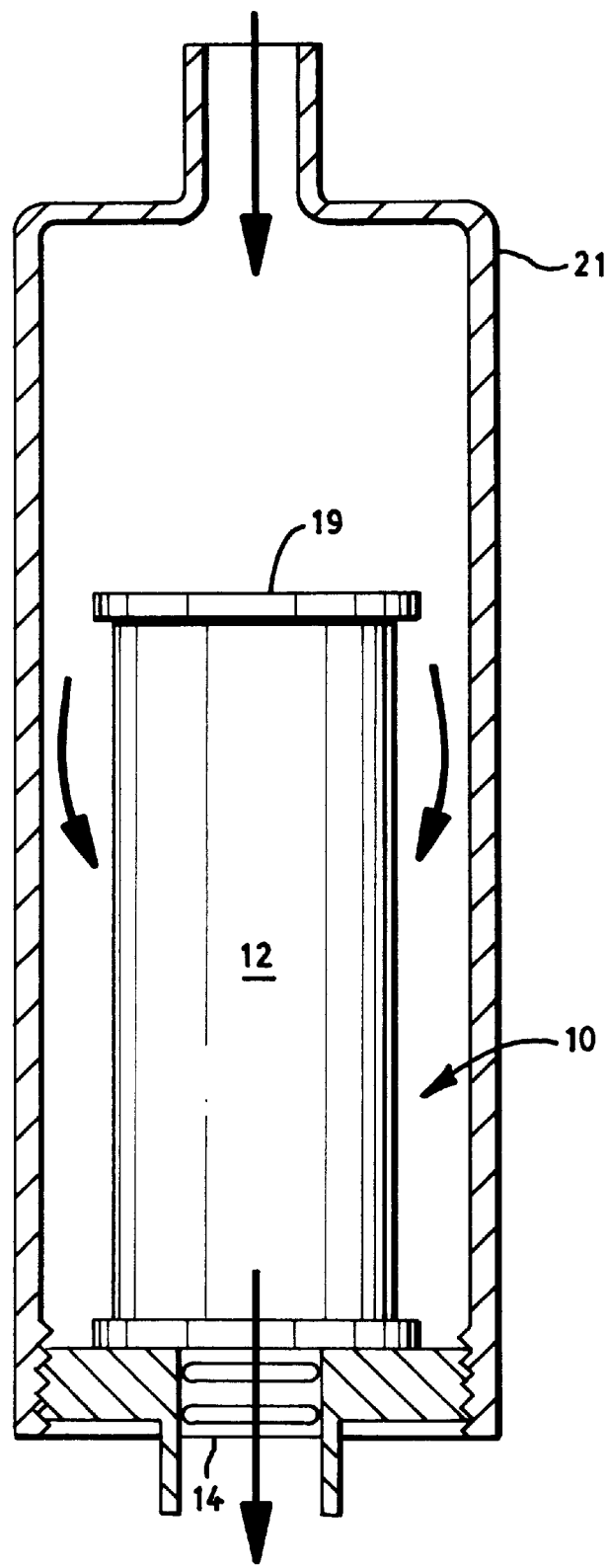
FIG. 1A is a partial cross sectional view of a housing useful with the present invention.

Referring to FIGS. 1 and 1A, the filter cartridge 10 of this invention includes an exposed outer surface 12 and an outlet 14. A would depth filter or a cylindrical seamless depth filter 16 includes the exposed outer surface 12. A pleated surface or screen filter 18 is positioned adjacent the outlet 14 and is supported by core 20. The core 20 includes holes 23 for fluid passage. The cap 19 seals the top surfaces 22 of filters 16 and 18 so that incoming fluid is required to pass first through surface 12. The cap 21 having outlet 14 thereon seals bottom surface 23 of filters 16 and 18 so that filtered fluid is required to pass through outlet 14. The cartridge 10 is positioned within housing 21 so that outlet 14 is positioned within housing outlet 26. Housing 20 is provided with fluid inlet 28. Flow of fluid to be filtered is exemplified by the arrows 29, 29A and 29B shown in FIG. 1A.

Figure 1B:
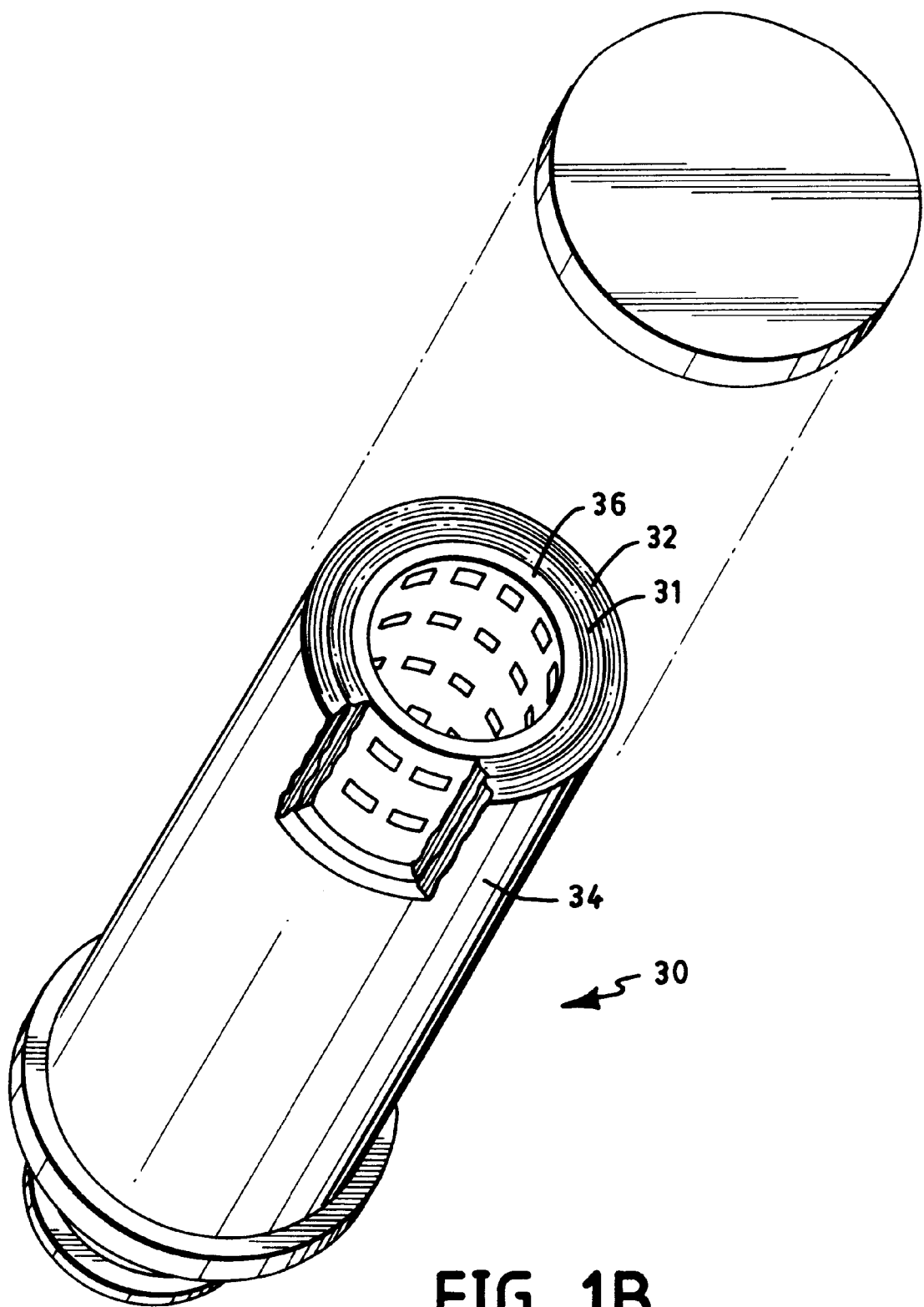
FIG. 1B is a perspective view in partial cross-section of a depth filter cartridge of the prior art.

Referring to FIG. 1B, the cartridge 30 of the prior art includes a depth filter or a cylindrical seamless depth filter 32 which includes an outer surface 34. A wound or cylindrical seamless surface or screen filter 31 is positioned adjacent screen 36 having holes 37.

In order to determine the pressure drop, capacity and retention performance characteristics of the filter cartridges of FIGS. 1 and 1B, within the housing of FIG. 1A the following comparison test was effected as Example 1.

EXAMPLE 1

The filter cartridges identified in Table 1 as Cartridge 1 (invention) is shown in FIG. 1 but utilizing a wound depth filter rather than a seamless cylindrical fibrous depth filter and Cartridge 1B (prior art) is shown in FIG. 1B were tested by being positioned within the housing shown in FIG. 1A. The wound depth filter is utilized for convenience and, for purposes of this test is equivalent to utilizing a cylindrical seamless filter. The cartridge were produced from the media described in Table 1.

TABLE 1

| Media Type | Media A Nonwoven | Media B Meltblown | Media C Meltblown | Media D Meltblown |
|---|---|---|---|---|
| All media polypropylene | | | | |
| Retention Efficiency 0.7 micron particles 2 media layers | less than 5% | 47% | 72% | 92% |
| Cartridge 1 invention | 20 wraps | 2 wraps | 2 wraps | 2 pleated layers |
| Cartridge 1B prior art | 20 wraps | 2 wraps | 2 wraps | 2 wraps |

The filtration surface area of media D in cartridge 1 is 490 in$^2$ and filtration area for cartridge 1B is 58 in$^2$. The retention efficiency of cartridge 1 and cartridge 1B was substantially the same.
The cartridges were tested with the following test methods:
Test Methods:
1. Water Pressure Drop
Clean water at 21° C. was flowed through the cartridge at 2 gallons per minute. Upstream (inlet) and downstream (outlet) pressures were taken. The differential pressure across the cartridge (upstream pressure minus downstream pressure) is reported in Table 2.

2. Retention Efficiency

An aqueous solution containing 0.1 ppm of AC fine test dust available from the AC Spark Plug Division of General Motors Corporation was flowed through the cartridge at 3.0 gallons per minute at a temperature of 22° C. A Model 4100 monitor with a Model 346 BCL particle sensor light scattering particle counter was used to determine the number of particles upstream (inlet) and downstream (outlet). The reduction of particles downstream is reported in Table 2 as a % retention efficiency of 0.7 micron particles.

3. Capacity/Throughput (Life)

Tap water was flowed through the cartridges at 2 gallons per minute at 21° C. while the differential pressure was monitored. (Differential pressure is upstream (inlet) pressure minus the downstream (outlet) pressure.) All cartridges tested simultaneously in separate housings to eliminate tap water variability effects. The flow of water continues until the differential pressure increases 8.0 psi greater than the initial pressure drop at which time the total volume of water (gallons) which has flowed through the cartridge is reported in table 2.

TABLE 2

| | Cartridge 1 | Cartridge 1B (Prior Art) |
|---|---|---|
| Water pressure drop | 1.3 psid | 8.8 psid |
| Retention efficiency of 0.7 micron | 98.3% | 99.8% |
| Throughput in gallons to 8 psi | 270 gal. | 30 gal. |

As shown in Table 2, cartridge 1 had essentially the same retention efficiency as the prior art but had a useful life nine times longer than the cartridge on the prior art and provided a much lower pressure drop during use.

EXAMPLE 2

This example illustrates that the filter cartridge of this invention has a significantly greater useful life as compared to a filter cartridge of the prior art having essentially the same retention efficiency.

The filter cartridges shown in Table 4 formed with layers having the characteristics shown in Table 3 were configured to form a wound depth filter cartridge and the filter cartridge of the invention. Tables 3 and 4 also show the construction of the pleated filter per se and the portion of the depth filter (Meltblown C and D) having essentially the same retention efficiency of the pleated filter per se. While these two layers have essentially the same retention efficiency, they differ in construction in that Meltblown layers C and D are wound and the pleated filter has a pleated configuration.

TABLE 3

| Media Type | Polypropylene/Construction | Weight g/m² | Thickness mils | Dioctyl Phthalate (DOP) Penetration | Air permeability CFM/ft² |
|---|---|---|---|---|---|
| A | Spunbonded | 30 | 8.0–10.0 | | 2200 |
| B | Spunbonded | 35 | 11.0 | | 360 |
| C | Meltblown | 20 | 6.0 | 88% | |
| D | Meltblown | 20 | 6.0 | 71% | |
| E | Meltblown (Calendered) | 79 | 6.5 | | 0.35 |

Spunbonded fiber diameter is 10 to 20 microns

Meltblown fiber diameter is 2–7 microns

Meltblown (Calendered) is a gradient density material with 4 different media types all calendered together

TABLE 4

MATERIAL TYPES

| | | Spunbonded A | Spunbonded B | Meltblown C | Meltblown D | Meltblown E |
|---|---|---|---|---|---|---|
| # of Layers | | 20 | 20 | 35 | 25 | 1 pleated |
| Filter Cartridge | Description | Inlet of Filter to --------- Outlet of Filter | | | | |
| Depth (Prior Art) | Wrapped Depth | X | X | X | X | |
| Depth/Pleat (Invention) | Wrapped Depth over pleated | X | X | | | X |
| Wrap 1 | Wrapped Inside media only | | | X | X | |
| Pleat P | Pleated media only | | | | | X |

The depth filter (prior art) and depth/pleat filter C (invention) were positioned in the same size housing having a length of 4.0 inches, a diameter of 2.8 inches and an inner core diameter of 1.4 inches.

In an initial test, the retention efficiencies were determined for the prior art wound depth filter cartridge, the filter cartridge of the invention, the pleated filter per se and the portion of the wound depth filter believed to have essentially the same retention efficiency as the pleated filter.

Retention efficiency was measured in accordance with the procedure set forth in Example 1 except that the measurement was effected for a particle range from 0.6 to 5.0 microns. Retention efficiency as % is shown in Table 5.

TABLE 5

| % Retention Efficiency for each Particle size band | | | | |
| --- | --- | --- | --- | --- |
| | Particle Size Microns | | | |
| | 0.6–0.8 | 0.8–1.0 | 1.0–2.0 | 2.0–5.0 |
| Pleat P, pleated only | 70.2 | 88.4 | 96.5 | 99.9 |
| Wrap I, inside wrap media C & D | 62.4 | 87.3 | 91.5 | 99.9 |
| Depth/Pleat (Invention) | 78.0 | 92.3 | 99.5 | 99.9 |
| Depth (Prior Art) | 65.5 | 89.8 | 95.8 | 99.9 |

As shown in Table 5, the Pleat P, pleated only filter has essentially the identical retention efficiency as the Wrap I, inside wrap media C&D filter. The surface area of the Pleat P, pleated only filter was 6.0 ft².

In an initial test, the pressure drop of both the prior art depth filter cartridge and the filter cartridge of this invention were measured with reverse osmosis (RO) water which was introduced into the filter at a rate of 4 gallons per minute. The pressure drop with the filter cartridge of this invention was 3.5 psi while the pressure drop of the depth filter cartridge was 7.7 psi. Thus the pressure drop of the filter cartridge of this invention was 55% lower than the pressure drop of the prior art depth filter cartridge.

Figure 7:
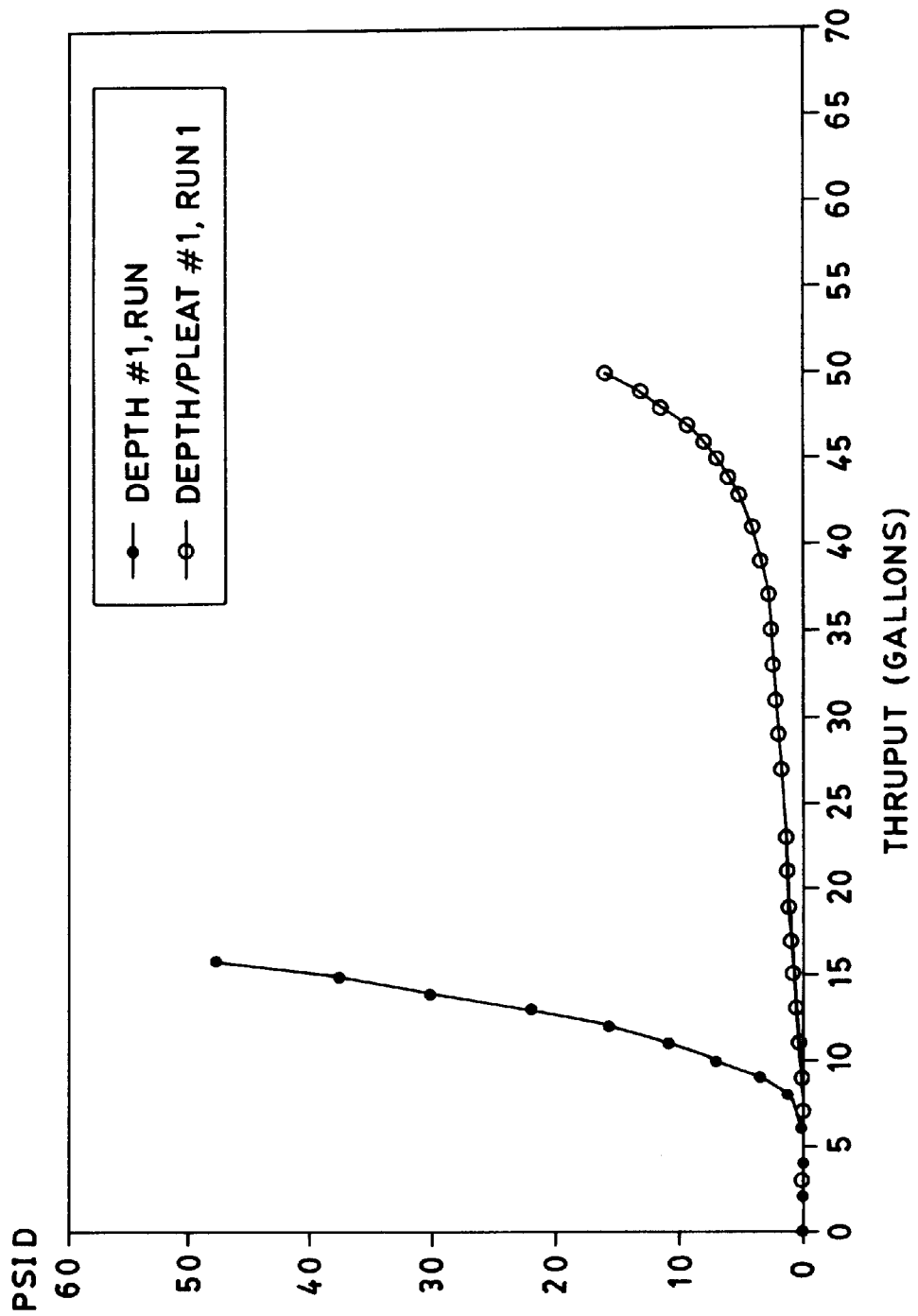
FIG. 7 is a graph of pressure as a function of liquid throughput through a filter of this invention and a filter of the prior art.

In order to determine the useful life of each of the prior art depth filter cartridge and the filter cartridge of this invention, they were installed into the same sized housing with a 1 gallon per minute flow controller downstream. RO water with a challenge RO water-dust mixture containing 80 ppm dust particles was filtered at a constant flow of 1 gallon per minute. Both pressures upstream of the filter cartridge and downstream of the filter cartridge were measured. The filtration was conducted in two test runs wherein the filtration in the depth filter cartridge was continued for a time until a pressure drop between the cartridge inlet and the cartridge outlet was 40 psi. Filtration with the filter cartridge of this invention was continued until a pressure drop between the cartridge inlet and the cartridge outlet was 40 psi or less. The results of the first run are shown in FIG. 7. As shown in FIG. 7, the throughput in gallons until 40 psi was reached for the prior art depth filter was 16 gallons while the throughput for the filter cartridge of this invention at only 18 psi was 50 gallons. These results show at least about a 200% increase of useful life for the cartridge of this invention as compared to a prior art depth filter cartridge having equivalent retention efficiency.

Figure 8:
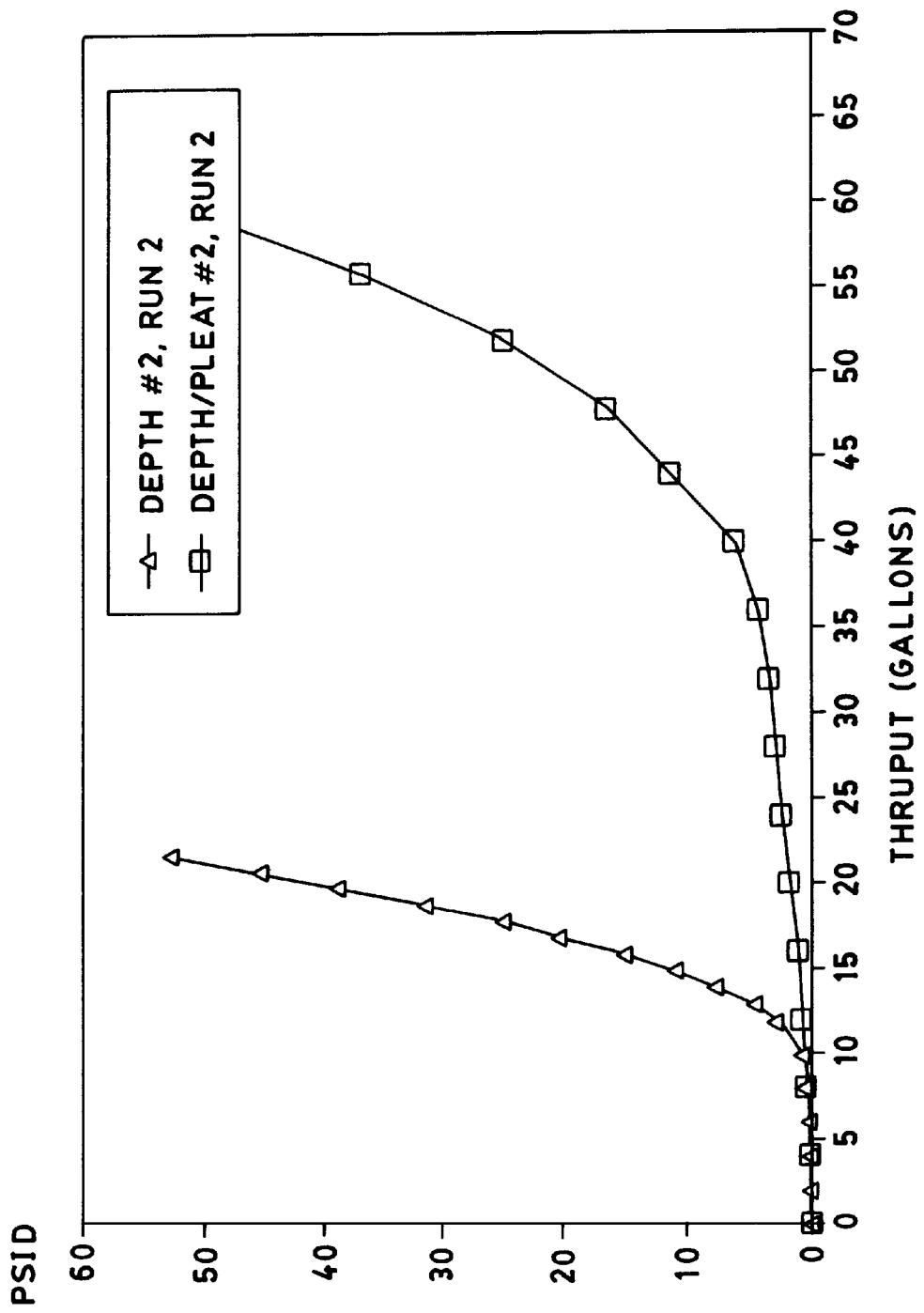
FIG. 8 is a graph of pressure as a function of liquid throughput through a filter of this invention and a filter of the prior art.

The results of the second run are shown in FIG. 8. As shown in FIG. 8, the pressure drop of 40 psi with the prior art depth filter was obtained at 20 gallons throughput while the throughput with the filter cartridge of this invention at 40 psi was 57 gallons. These results show at least about a 190% increase of useful life for the cartridge of this invention as compared to a prior art depth filter cartridge having equivalent retention efficiency.

In final comparison tests, the useful life of the wound depth filter of the prior art was compared with the useful life of the filter cartridge or this invention when challenged with the same Bedford Mass. tap water containing colloidal and hard particles at a flow rate of 3 gallons per minute. Capacity/Throughput (life) was determined by the method set forth in Example 1.

Figure 9:
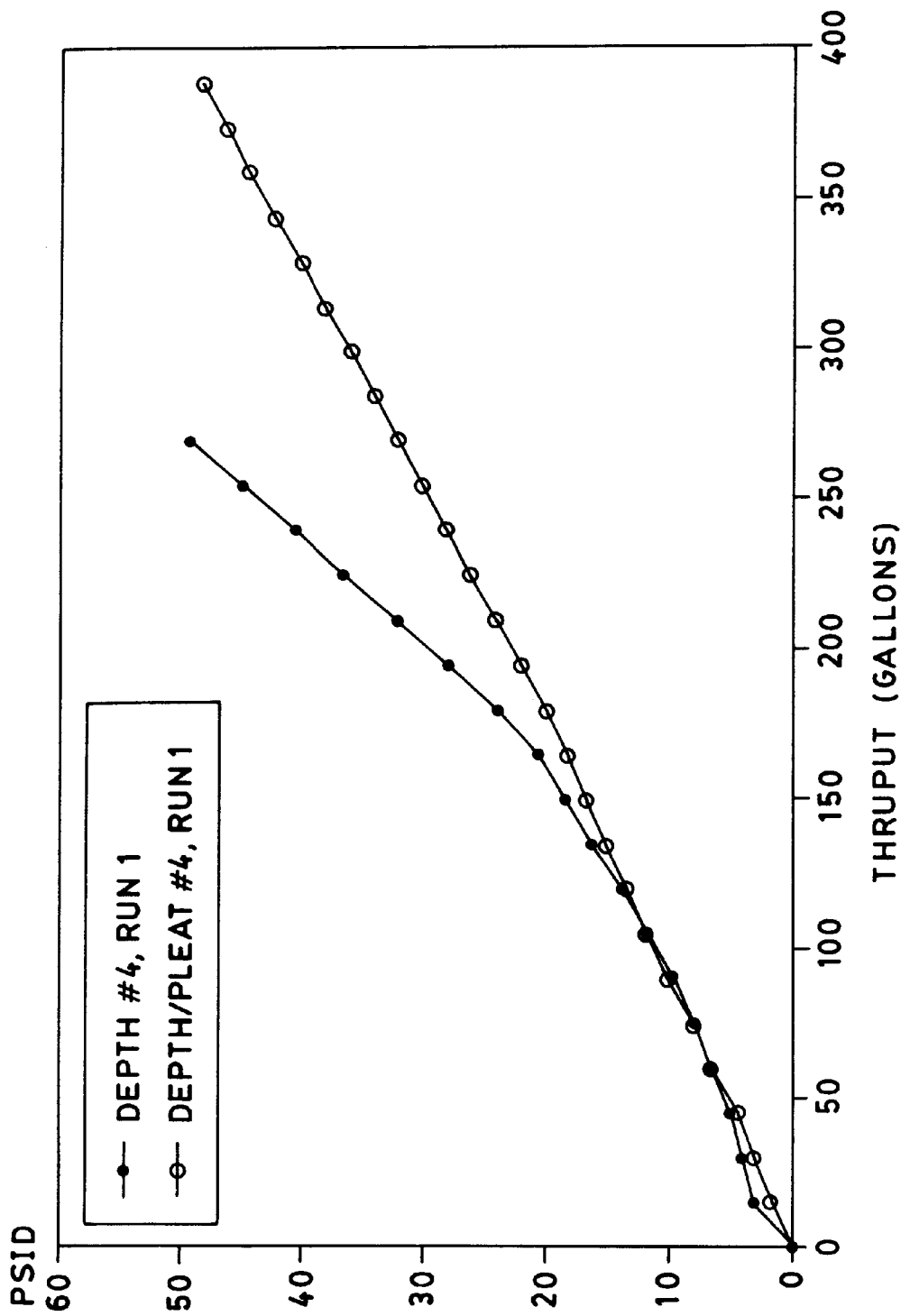
FIG. 9 is a graph of pressure as a function of liquid throughput through a filter of this invention and a filter of the prior art.

As shown in FIG. 9 the throughput attained in one run when reaching a 40 psi pressure drop across the prior art depth filter cartridge was 235 gallons while the throughout with the filter cartridge of this invention with the same pressure drop was 330 gallons. This result shows at least about a 40% increase in useful life when exposed to colloidal particles with the filter cartridges of this invention as compared to a prior art filter cartridge having equivalent retention efficiency.

Figure 10:
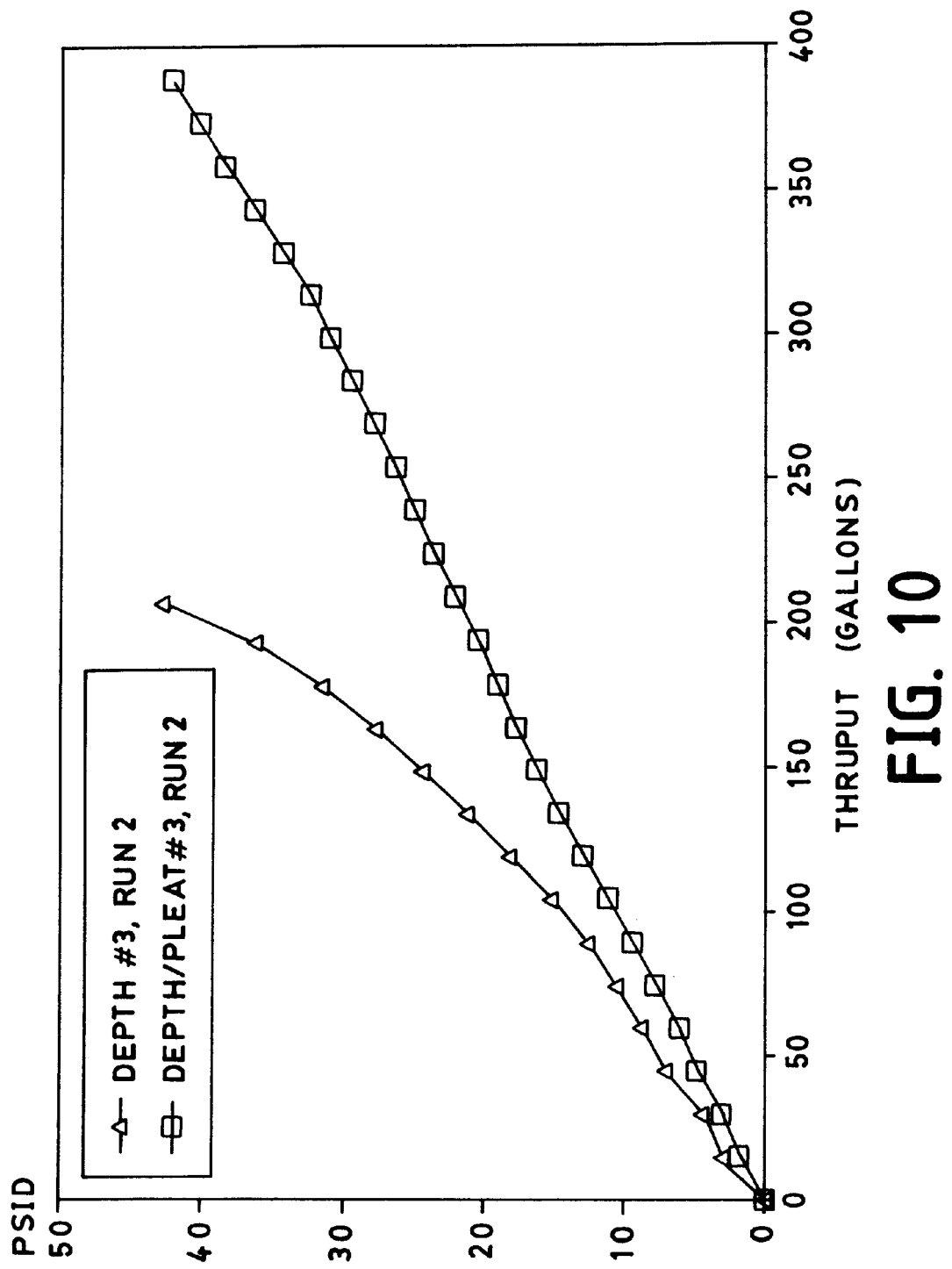
FIG. 10 is a graph of pressure as a function of liquid throughput through a filter of this invention and a filter of the prior art.

As shown in FIG. 10 the throughput attained in a second run when reaching a 40 psi pressure drop across the prior art depth filter cartridge was 205 gallons while the throughout with the filter cartridge of this invention with the same pressure drop was 375 gallons. This result shows at least about an 80% increase in useful life as compared to a prior art filter cartridge having equivalent retention efficiency.

Thus, the filter cartridge of this invention exhibit a significantly extended useful life as compared with prior art depth filters when exposed to either hard particles or hard particles and colloidal particles.

Figure 2:
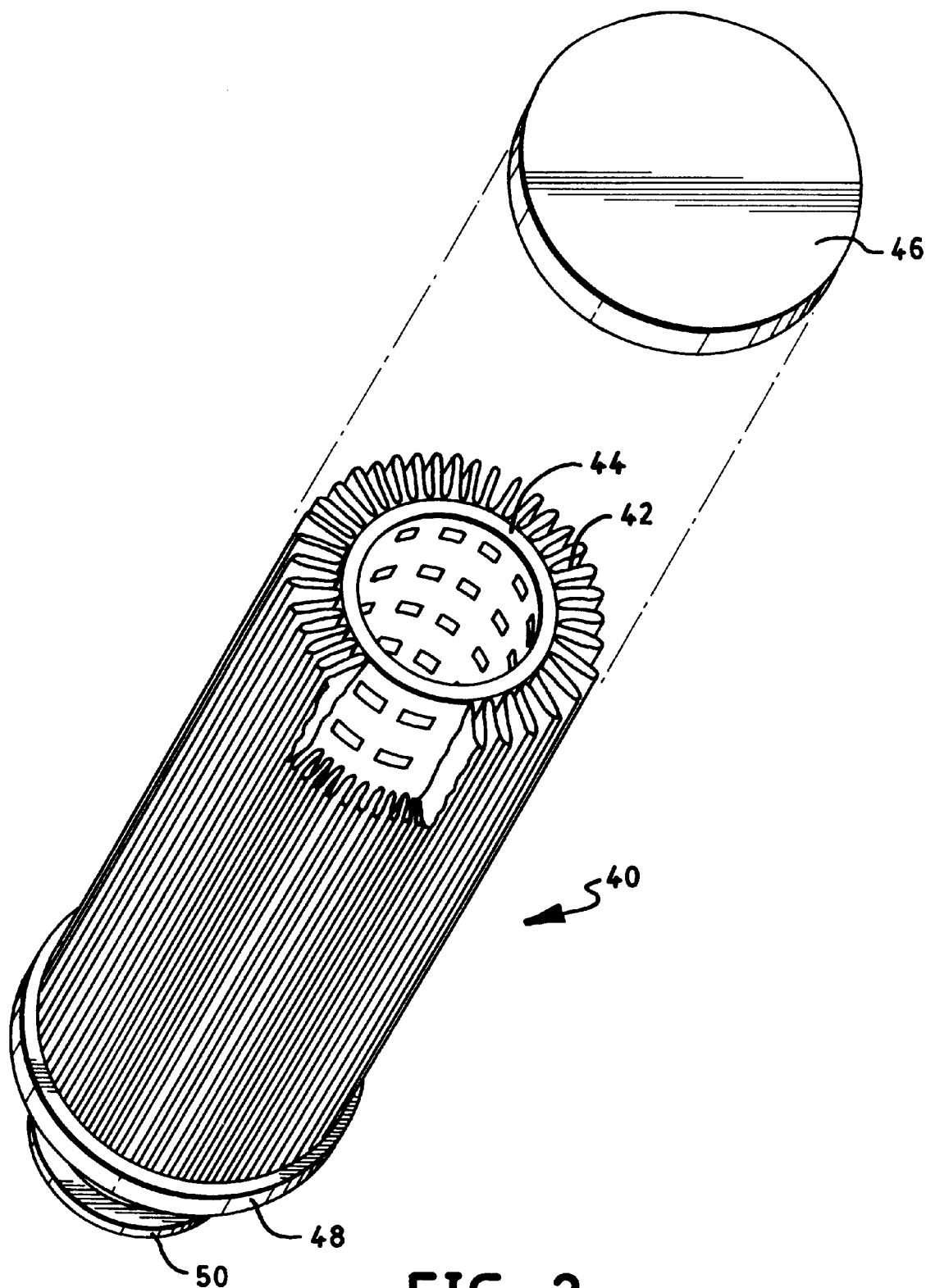
FIG. 2 is a perspective view in partial cross-section of a pleated surface or screen filter of the prior art.

Referring to FIG. 2, the pleated final filter cartridge 40 of the prior art is shown. The cartridge 40 is presently utilized as a final filter in series with the cartridge 10 shown in FIG. 1B. The cartridge 40 comprises a pleated screen or surface filter 42 which surrounds a core 44 and is provided with a sealing cap 46 and a second cap 48 having an outlet 50.

Figure 3:
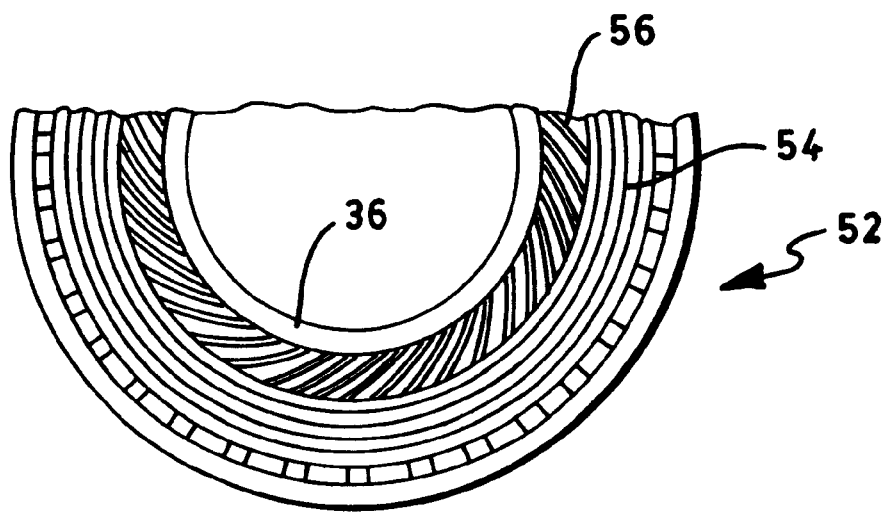
FIG. 3 is a cross-sectional view of an embodiment of this invention utilizing a spiral pleated surface or screen filter.

Referring to FIG. 3, the filter cartridge 52 includes a wound depth filter or a cylindrical seamless depth 54 filter having a plurality of layers having differing micron retention characteristics and a spiral pleated screen or surface filter 56. If desired, a porous sleeve can be interposed between depth filter 54 and screen or surface filter 56 to provide support and promote fluid flow. The cartridge 52 includes core screen 36.

Figure 4:
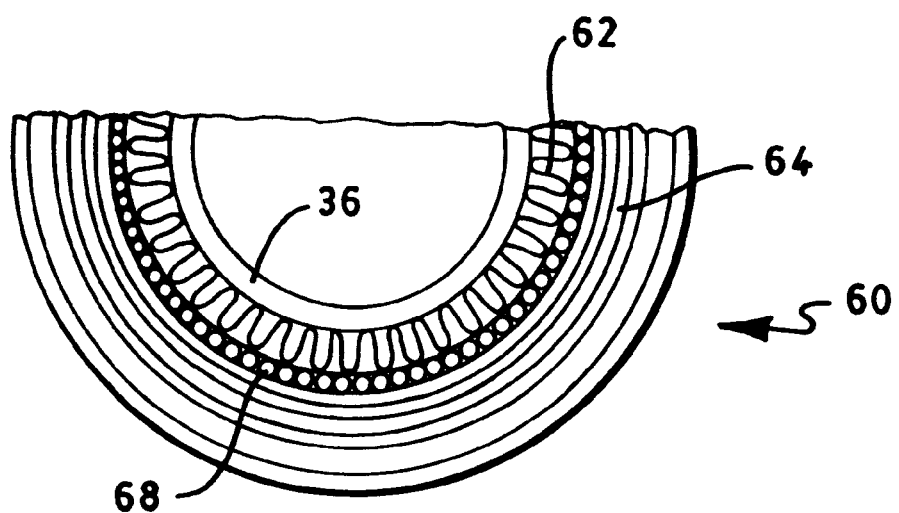
FIG. 4 is a cross-sectional view of an embodiment of this invention utilizing a pleated surface or screen filter and an internal support sleeve.

Referring to FIG. 4, an alternative filter cartridge 60 of this invention is shown. The cartridge 60 includes a pleated screen or surface filter 62 and the wound depth filter or cylindrical seamless depth filter 64 which are separated by and supported by screen 68. The cartridge 60 includes core screen 36.

Figure 5:
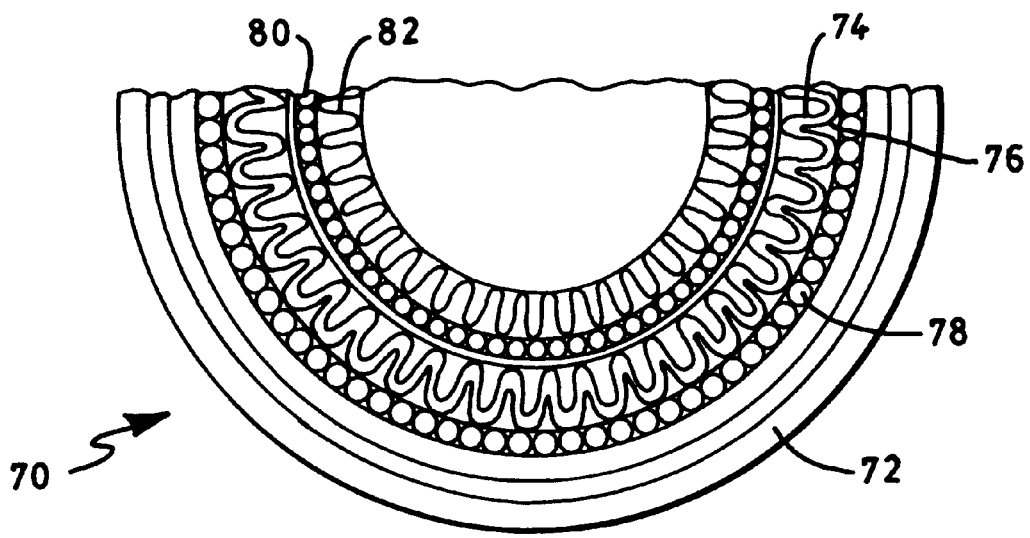
FIG. 5 is a cross-sectional view of one embodiment of this invention utilizing a plurality of pleated surface or screen filters.

Referring to FIG. 5, an alternative filter cartridge 70 of this invention is shown. The cartridge 70 includes the wound depth filter or cylindrical seamless a depth filter 72 and a screen or surface filter layer which includes two pleated screen or surface filters 74 and 76 which are arranged concentrically adjacent relative to each other. The pleated filters 74 and 76 are separated from depth filter 72 by screen 78. Screen 80 separates pleated surface or screen filter 82 from pleated filters 74 and 76. Thus, as shown in FIG. 5, the filter cartridge of this invention can have a plurality of pleated layers and each pleated layer can comprise one or more pleated filters.

Figure 6:
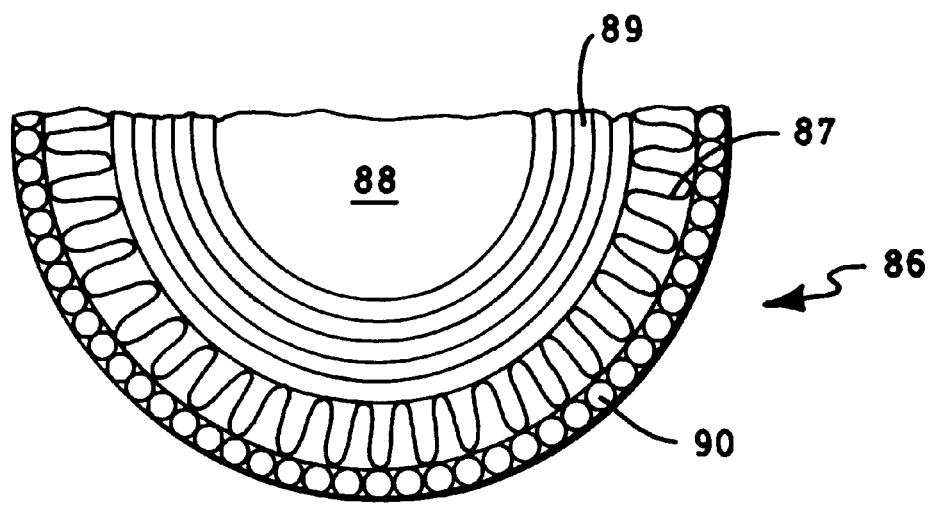
FIG. 6 is a cross-sectional view of one embodiment of this invention wherein the inlet is positioned within the core of the cartridge of this invention.

Referring to FIG. 6, the filter cartridge 86 has an inlet 88 positioned at the central portion thereof rather than having the outlet positioned at the central portion thereof as exemplified by the filter cartridge 10 of FIG. 1. The filter cartridge 86 includes a pleated surface or screen filter 87, a wound depth filter or cylindrical seamless depth filter 89 and a support screen 90. Flow of fluid to the filters is in a direction the reverse of the arrows 29, 29A and 29B shown in FIG. 1A.

We claim:

1. A filter element for filtering particles from a liquid which comprises:

a pleated filter having a first percent retention efficiency of particles of a given size, a first cylindrical seamless depth filter formed of a plurality of filtration media formed from thermoplastic fibers, a first of said filtration media having a lowest percent retention efficiency of said particles being positioned adjacent an inlet means to said element, a second of said filtration media having a highest percent retention efficiency of said particles being positioned adjacent said pleated filter, said pleated filter being positioned adjacent an outlet means for removing filtered liquid from said filter element, a screen supporting said pleated filter, said pleated filter having a higher percent retention efficiency of said particles than said first cylindrical seamless depth filter, said first cylindrical seamless depth filter and said pleated filter surrounding a central opening which extends the length of said cylindrical seamless depth filter and said pleated filter, said first cylindrical seamless depth filter and said pleated filter defining a first surface at one end which is sealed and said first cylindrical seamless depth filter and said pleated filter defining a second surface at an end opposite to said first end which is sealed with a second seal having a second opening that communicates with said central opening, said filter element having a pressure drop across said depth filter and said pleated filter less than a predetermined pressure drop when challenged with water containing fine hard particle test dust for a time period at least about 100% longer than a second filter element formed from said first cylindrical seamless depth filter and a second cylindrical seamless depth filter having a percent retention efficiency of said particfles substantially the same as said first percent retention efficiency percent of said pleated filter.

2. The filter element of claim 1 wherein said pleated filter is contiguous with said central opening.

3. The filter element of claim 1 wherein said depth filter is contiguous with said central opening.

4. The filter element of claim 1 including at least one third of said filtration media positioned between said first of said filtration media and said second of said filtration media, said at least one third of said filtration media having pores of a progressively higher percent retention efficiency of said particles in a direction from said first of said filtration media to said second of said filtration media.

5. The filter element of any one of claims 1, 2, 3, or 4 wherein pleats forming said pleated filter are positioned in the form of a spiral.

6. The filter element of any one of claims 1, 2, 3, or 4 wherein said pleated filter includes a plurality of pleated porous membrane filters.

7. The filter element of any one of claims 1, 2, 3, or 4 wherein said pleated filter includes a plurality of porous membrane filters arranged concentrically adjacent relative to each other and a screen positioned adjacent said pleated porous membrane filters.

8. A filter assembly for filtering particles from a liquid which comprises:

a housing having an inlet for liquid to be filtered and an outlet for filtered liquid, a filter cartridge including a first cylindrical seamless depth filter and a pleated filter positioned within said housing, said pleated filter having a first percent retention efficiency of particles of a given size, said first cylindrical seamless depth filter formed of a plurality of filtration media formed from thermoplastic fibers including a first of said filtration media having a lowest percent retention efficiency of said particles positioned adjacent said fluid inlet means and a second of said filtration media having a highest percent retention efficiency of said particles being positioned adjacent said pleated filter, said pleated filter being positioned adjacent said outlet, a screen supporting said pleated filter, said pleated filter having a higher percent retention efficiency of said particles than said second of said filtration media, said first cylindrical seamless depth filter and said pleated filter surrounding a central opening which extends the length of said first cylindrical seamless depth filter and said pleated filter, said first cylindrical seamless depth filter and said pleated filter defining a first surface at one end which is sealed and said first cylindrical seamless depth filter and said pleated filter defining a second surface at an end opposite to said first end which is sealed with a second seal having a second opening that communicates with said central opening, said filter assembly having a pressure drop between said inlet and said outlet less than a predetermined pressure drop when challenged with water containing fine hard particle test dust for a time period at least about 100% longer than a second filter element formed from said first cylindrical seamless depth filter and a second cylindrical seamless depth filter having a percent retention efficiency of said particles substantially the same as said first percent retention efficiency of said particles of said pleated filter.

9. The filter assembly of claim 8 including at least one third of said filtration media positioned between said first of said filtration media and said second of said filtration media said at least one third of said filtration media having a progressively higher percent retention efficiency of said particles in a direction from said first of said filtration media to said second of said filtration media.

10. The filter assembly of claim 8 wherein said pleated filter is contiguous with said central opening and said central opening is in fluid communication said outlet.

11. The filter assembly of claim 8 wherein said depth filter is contiguous with said central opening and said central opening is in fluid communication with said inlet.

12. The filter assembly of any of the claims 8, 9, 10 or 11 wherein pleats forming said pleated filter are positioned in the form of a spiral.

13. The filter assembly of any one of claims 8, 9, 10 or 11 wherein said pleated filter includes a plurality of porous membrane filters.

14. The filter assembly of any one of claims 8. 9, 10 or 11 wherein said pleated filter includes a plurality of pleated porous membrane filters arranged concentrically adjacent relative to each other and a screen positioned between said pleated filter and said depth filter.

15. A filter element for filtering particles from a liquid which comprises:

a pleated filter having a first percent retention efficiency of particles of a given size, a first wound depth filter being formed of a plurality of filtration media, a first of said filtration media being formed of fibers in sheet form and having a lowest percent retention efficiency of said particles being positioned adjacent an inlet means for introducing a liquid to be filtered into said element, a second of said filtration media being formed of fibers in sheet form and having a highest percent retention efficiency of said particles being positioned adjacent said pleated filter, said pleated filter being positioned adjacent an outlet means for removing filtered liquid from said filter element, a screen supporting said pleated filter, said pleated filter having a higher percent retention efficiency of said particles than said first wound depth filter, said first wound depth filter and said pleated filter surrounding a central opening which extends the length of said first wound depth filter and said pleated filter, said first wound depth filter and said pleated filter defining a first surface at one end which is sealed and said first wound depth filter and said pleated filter defining a second surface at an end opposite to said first end which is sealed with a second seal having a second opening that communicates with said central opening, said filter element having a pressure drop across said depth filter and said pleated filter less than a predetermined pressure drop when challenged with water containing fine hard particle test dust for a time period at least about 100% longer than a second filter element formed from said first wound depth filter and a second wound depth filter having a percent retention efficiency of said particles substantially the same as said percent retention efficiency of said particles of said pleated filter.

16. The filter element of claim 15 wherein said pleated filter is contiguous with said central opening.

17. The filter element of claim 15 wherein said depth filter is contiguous with said central opening.

18. The filter element of claim 15 including at least one third of said filtration media positioned between said first of said filtration media and said second of said filtration media, said at least one third of said filtration media being formed of fibers in sheet form and having a progressively higher percent retention efficiency of said particles in a direction from said first of said filtration media to said second of said filtration media.

19. The filter element of any one of claims 15, 16, 17 or 18 wherein pleats forming said pleated filter are positioned in the form of a spiral.

20. The filter element of any one of claims 15, 16, 17 or 18 wherein said pleated filter includes a plurality of pleated porous membrane filters.

21. The filter element of any one of claims 15, 16, 17 or 18 wherein said pleated filter includes a plurality of porous membrane filters arranged concentrically adjacent relative to each other and a screen positioned adjacent said pleated porous membrane filters.

22. A filter assembly which comprises:

a housing having an inlet for introducing liquid to be filtered into said assembly and an outlet for removing filtered liquid from said filter element, a filter cartridge including a first wound depth filter and a pleated filter positioned within said housing, said first wound depth filter being formed of a plurality of filtration media including a first of said filtration media being formed of fibers in sheet form and having a lowest percent retention efficiency of particles of a given size positioned adjacent said inlet and a second of said filtration media being formed of fibers in sheet form and having a highest percent retention efficiency of said particles being positioned adjacent said pleated filter, said pleated filter being positioned adjacent said outlet, a screen supporting said pleated filter, said pleated filter having a higher percent retention efficiency of said particles than said second of said filtration media, said first wound depth filter and said pleated filter surrounding a central opening which extends the length of said first wound depth filter and said pleated filter, said first wound depth filter and said pleated filter defining a first surface at one end which is sealed and said first wound depth filter and said pleated filter defining a second surface at an end opposite to said first end which is sealed with a second seal having a second opening that communicates with said central opening, said filter assembly having a pressure drop between said inlet and said outlet less than a predetermined pressure drop when challenged with water containing fine hard particle test dust for a time period at least about 100% longer than a second filter element formed from said first wound depth filter and a second wound depth filter having a percent retention efficiency of said particles substantially the same as said first percent retention efficiency of said particles of said pleated filter.

23. The assembly of claim 22 including at least one third of said filtration media positioned between said first of said filtration media medium and said second of said filtration media, said at least one third of said filtration media being formed of fibers in sheet form and having a progressively higher percent retention efficiency of said particles in a direction from said first of said filtration media to said second of said filtration media.

24. The assembly of claim 22 wherein said pleated filter is contiguous with said central opening and said central opening is in fluid communication with said outlet.

25. The assembly of claim 22 wherein said depth filter is contiguous with said central opening and said central opening is in fluid communication with said inlet.

26. The assembly of any of the claims 22, 23, 24 or 25 wherein pleats forming said pleated filter are positioned in the form of a spiral.

27. The assembly of any one of claims 22, 23, 24 or 25 wherein said pleated filter includes a plurality of porous membrane filters.

28. The assembly of any one of claims 22, 23, 24 or 25 wherein said pleated filter includes a plurality of pleated porous membrane filters arranged concentrically adjacent relative to each other and a screen positioned between said pleated filters and said wound depth filter.

29. A process for filtering particles from a liquid which comprises:

introducing a liquid to be filtered into a filter assembly which includes a housing having an inlet for introducing liquid to be filtered and an outlet for filtered liquid, a filter cartridge including a first cylindrical seamless depth filter and a pleated filter positioned within said housing, said pleated filter having a first percent retention efficiency of particles of a given size said first cylindrical seamless depth filter formed of a plurality of filtration media formed from the thermoplastic fibers including a first of said filtration media having a lowest percent retention efficiency of said particles positioned adjacent said inlet and a second of said filtration media having a highest percent retention efficiency of said particles being positioned adjacent said pleated filter, said pleated filter being positioned adjacent said outlet, a screen supporting said pleated filter, said pleated fiber having a higher percent retention efficiency of said second of said filtration media, said first cylindrical seamless depth filter and said pleated filter surrounding a central opening which extends the length of said first cylindrical seamless depth filter and said pleated filter, said first cylindrical seamless depth filter and said pleated filter defining a first surface at one end which is sealed and said first cylindrical seamless depth filter and said pleated filter defining a second surface at an end opposite to said first end which is sealed with a second seal having a second opening that communicates with said central opening, said filter assembly having a pressure drop between said inlet and said outlet less than a predetermined pressure drop when challenged with water containing fine hard particles test dust at a given flow rate for a time period at least about 100% longer than a second filter element challenged with said water containing said fine hard particle test dust at said flow rate and formed from said first cylindrical seamless depth filter and a second cylindrical seamless depth filter having a percent retention efficiency of said particles substantially the same as said first percent retention efficiency of said particles of said pleated filter, passing said liquid to be filtered through said cylindrical seamless filter and said pleated filter, and removing filtered liquid from said outlet.

30. The process of claim 29 wherein said liquid to be filtered is also passed through at least one third of said filtration media positioned between said first of said filtration media and said second of said of filtration media, said at least one third of said filtration media being formed of fibers in sheet form and having a progressively higher percent retention efficiency of said particles in a direction from, said first of said filtration media to said second of said filtration media and wherein said liquid to be filtered is passed sequentially through said first of said filtration media, said at least one third of said filtration media and said second of said filtration media.

31. The process claim 29 wherein said pleated filter is contiguous to said central opening and the liquid to be filtered is introduced into an outside surface of said first cylindrical seamless depth filter.

32. The process of claim 29 whenever said depth filter is contiguous to said central opening and said liquid to be filtered is introduced through said central opening.

33. The process of claim 29 wherein said pleated filter include a plurality or pleated porous membrane filter and said liquid to be filtered is passed through all of said pleated porous membrane filters.

34. A process for filtering particles from a liquid which comprises:

introducing a liquid to be filtered into a filter assembly which includes a housing having an inlet for introducing liquid to be filtered and an outlet for removing filtered liquid from said filter element, a filter cartridge including a first wound depth filter and a pleated filter positioned within said housing, said first wound depth filter being formed of a plurality of filtration media including a first of said filtration media being formed of fibers in sheet form and having a lowest percent retention efficiency of particles of a given size positioned adjacent said inlet and a second of said filtration media being formed of fibers in sheet form and having a highest percent retention efficiency of said particles being positioned adjacent said pleated filter, said pleated filter being positioned adjacent said outlet, a screen supporting said pleated filter, said pleated filter having a higher percent retention efficiency of said particles than said second of said filtration media, said first wound depth filter and said pleated filter surrounding a central opening which extends the length of said first wound depth filter and said pleated filter, said first wound depth filter and said pleated filter defining a first surface at one end which is sealed and said first wound depth filter and said pleated filter defining a second surface at an end opposite to said first end which is sealed with a second seal having a second opening that communicates with said central opening, said filter assembly having a pressure drop between said inlet and said outlet less than a predetermined pressure drop when challenged with water containing fine hard particle test dust at a given flow rate for a time period at least about 100% longer than a second filter element challenged with said water containing said fine hard particle test dust at said flow rate and formed from said first would depth filter and a second wound depth filter having a percent retention efficiency of said particles substantially the same as said first percent retention efficiency of said particles of said pleated filter passing said liquid to be filtered through said first wound depth filter and said pleated filter, and removing filtered liquid from said outlet.

35. The process of claim 34 wherein said liquid to be filtered is also passed through at least one third of said filtration media positioned between said first of said filtration media and said second of said filtration media, said at least one third of said filtration media being formed of fibers in sheet form and having a progressively higher percent retention efficiency of said particles in a direction from said first of said filtration media to said second of said filtration media, and wherein said liquid to be filtered is passed sequentially through said first of said filtration media, said at least one third of said filtration media and said second of said filtration media.

36. The process if claim 34 wherein said pleated filter is contiguous to said central opening and the liquid to be filtered is introduced into an outside surface of said first cylindrical seamless depth filter.

37. The process of claim 34 wherever said depth filter is contiguous to said central opening and said liquid to be filtered is introduced through said central opening.

38. The process of claim 34 wherein said pleated filter includes a plurality or pleated porous membrane filters and said liquid to be filtered is passed through all of said pleated porous membrane filters.

* * * * *